United States Patent [19]
Leistner

[11] 3,849,683
[45] Nov. 19, 1974

[54] POLE ELEMENT FOR A SYNCHRONOUS ELECTRIC MACHINE HAVING A LAMINATED LINK ROTOR

[75] Inventor: Werner Leistner, Berlin, Germany

[73] Assignee: Siemens Aktiengesellschaft, Munich, Germany

[22] Filed: May 4, 1973

[21] Appl. No.: 357,260

[30] Foreign Application Priority Data
May 18, 1972    Germany............................ 2224911
Sept. 20, 1972  Germany............................ 2246448

[52] U.S. Cl................................ 310/218, 310/183
[51] Int. Cl. ................................................ H02k 1/28
[58] Field of Search ........... 310/269, 259, 218, 163, 310/164, 263, 264, 265, 183, 186, 190, 216, 217

[56] References Cited
UNITED STATES PATENTS
| | | | |
|---|---|---|---|
| 505,926 | 10/1893 | Schmid........................... | 310/218 X |
| 571,462 | 11/1896 | Thompson et al.................. | 310/218 |
| 751,563 | 2/1904 | Rushmore.......................... | 310/218 |
| 2,456,983 | 12/1948 | Morse............................... | 310/183 |

Primary Examiner—Mark O. Budd
Attorney, Agent, or Firm—Kenyon & Kenyon Reilly Carr & Chapin

[57] ABSTRACT

A pole element for a synchronous electric machine having a laminated link rotor of the type mounted on the rim of the rotor by a base member integrally formed therewith, including a pair of partial poles disposed at the ends of the pole element and at least one complete pole disposed therebetween and spaced apart from the partial poles.

6 Claims, 4 Drawing Figures

POLE ELEMENT FOR A SYNCHRONOUS ELECTRIC MACHINE HAVING A LAMINATED LINK ROTOR

BACKGROUND OF THE INVENTION

1. Field of the Invention

The invention relates to synchronous electric machines, and in particular, to laminated link rotor poles therefor.

2. Description of the Prior Art

Synchronous electric machine rotors having large rated outputs and large diameters are generally constructed as laminated link rotors. Such rotors comprise a rim fabricated of laminated segments to which the poles of the machine are affixed, and which is supported by radially outwardly extending spokes attached to a rotatable hub. The poles of the machine are attached to the rotor by suitable shaped base members integrally formed therewith which are inserted into correspondingly shaped slots in the rotor ring and secured therein by longitudinal bolts. The bases of such poles are typically T or dove-tail shaped. For a detailed description of the construction of such a rotor, see Moeller, Werr, *Leitfaden der Elektrotechnik* Vol. III, "Design and Strength Calculations of Electric Machines," (Third Ed. 1955) pp. 40–41.

Since the poles of the machine are each separately mounted on the rim of the rotor, damaged poles may be replaced individually, a significant maintenance advantage. However, because of tolerances between the bases of the poles and the slots in which they are disposed, residual air gaps are formed therebetween despite careful fabrication of the rotor and padding of the slots. Since the magnetic flux of the machine travels through the base of each pole, the air gaps form bottlenecks in the magnetic flux flow between the rotor and the stator of the machine, and, as a result, the excitation field must be increased to compensate for the losses caused by the air gaps. Furthermore, since the absolute magnitude of the magnetic flux bottlenecks are approximately the same, the losses produced thereby increase in magnitude as the residual air gap between the bases of the poles and the rotor rim decreases, especially in machines having a great number of poles.

SUMMARY OF THE INVENTION

It is, therefore, an object of the invention to provide a pole element for a synchronous electric machine having a laminated link rotor which eliminates magnetic flux losses caused by the existence of residual air gaps between the poles and the rotor rim of the machine.

Accordingly, the invention provides in a synchronous electric machine having a laminated link rotor including a plurality of poles disposed on the periphery thereof, a pole element including a pair of partial poles disposed at the ends of the pole element and at least one complete pole disposed therebetween and spaced apart from the partial poles. An excitation winding, comprising a plurality of spaced apart conductors, are disposed between the poles of the element. The pole elements include damper bars disposed in the ends of the partial and complete poles, and a flexible electrically conductive strap member for electrically interconnecting the partial poles of adjacent pole elements. Each of the poles of the element is spaced apart from the periphery of the rotor of the machine by the pole element to prevent flow of the magnetic flux of the machine through the base members of each pole element, thereby preventing magnetic flux loss caused by residual air gaps formed between the bases of the pole element and the rotor rim.

In another embodiment of the invention, the pole element is spaced apart from the periphery of the rotor rim, so as to form cooling spaces therebetween, and is divided into a plurality of spaced apart stacks, also having cooling spaces disposed therebetween for cooling the pole element.

The inventive device differs from those heretofore known in that pole elements, having a plurality of poles disposed thereon, are attached to the rim of a laminated link rotor instead of individual poles. The magnetic flux flowing between the rotor and the stator of the machine thus is not lost in any residual air gaps formed between the pole element and rotor rim since the flux does not flow through the base thereof. As a result, the rotor rim no longer conducts the flow of the magnetic flux and serves only as a means for mechanically attaching the pole element to the rotor. The effect of the residual air gaps on the required field excitation of the machine is thereby eliminated.

BRIEF DESCRIPTION OF THE DRAWINGS

In the several views of the drawings, similar reference numerals denote similar elements throughout.

DETAILED DESCRIPTION

Figure 1:
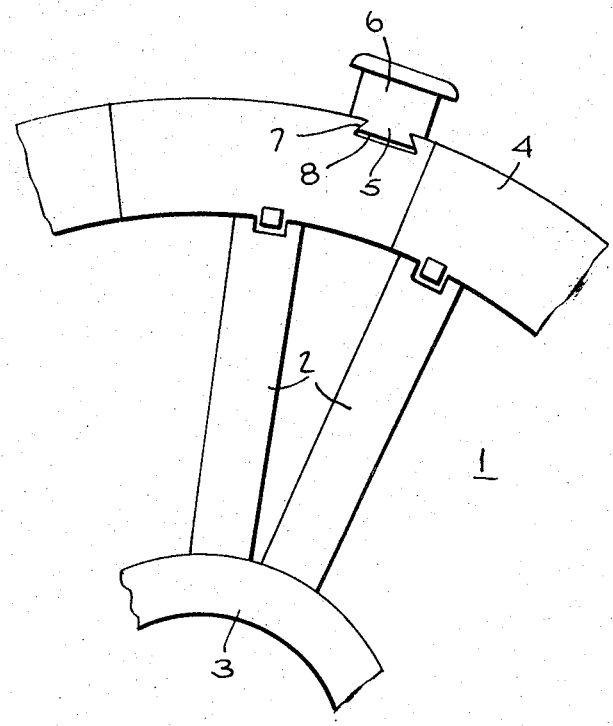
FIG. 1 is a partial schematic view of a conventional laminated link for a synchronous electric machine.

Referring now to the drawings, specifically FIG. 1, there is shown a laminated link rotor 1 for a synchronous electric machine of conventional design. The rotor comprises a hub 3 which supports a rotor rim 4, composed of a plurality of separate laminated steel segments, by means of a plurality of radially outwardly extending spokes 2 coupled to the hub. A plurality of poles 6 are mounted on rotor rim 4 by means of slots 7 in the periphery of the rim and suitably shaped pole bases 5 which are disposed in the slots. The geometric shape of each slot and base, which is illustrated as being dove-tail shaped in the drawings, is chosen so as to prevent radial movement of pole 6. During the fabrication of such conventional rotors, despite accurate machining and careful assembly and padding of the rotor, a residual air gap 8 is formed between bases 5 of the poles and the slots in rim 4 of the rotor. (Air gap 8 is exaggerated in FIG. 1 for purposes of illustration.) This air gap creates a bottleneck in the flow of the magnetic flux in poles 6 and rim 4, and, as a result of losses, the magnetic field excitation required to operate the machine is increased.

Figure 2:
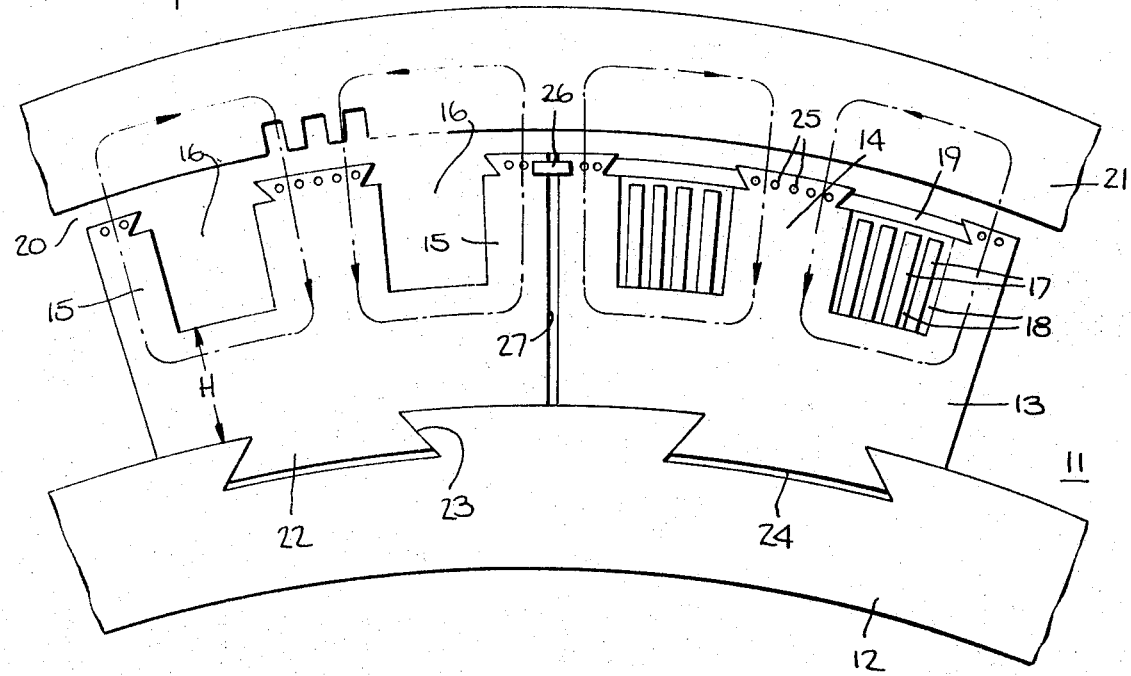
FIG. 2 is a partial, radial sectional view of a pole element for a laminated link rotor constructed according to the invention.

In FIG. 2 there is illustrated one embodiment of a rotor pole element constructed according to the invention which overcomes this problem. The rotor is of the laminated link type, and comprises a rim 12 on which a plurality of pole elements 13 are disposed. Each of the elements is comprised of a complete pole 14 disposed approximately at the center thereof and a pair of partial poles 15, shown as being pole halves, which comprise the sides of each element. Pole 14 and poles 15 are separated by pole gaps 16. Only alternate poles of the pole elements are provided with excitation windings, the latter of which are disposed in air gaps 16. The excitation windings comprise a plurality of spaced apart conductors 17 having interdisposed cooling ducts 18, which are mechanically secured in gaps 16 by a wedge shaped locking member 19 disposed in a slot provided in the pole element adjacent air gaps 16. The conductors fill the entire air gap around the pole and thus can be cooled directly by a suitable cooling liquid.

This mechanical design of the rotor limits the flow of the magnetic flux in the machine substantially to the pole elements 13 and the stator stack 21 of the machine. As illustrated by the arrows in FIG. 2, the magnetic flux flows between stator stack 21 across air gap 20 and through poles 14 and 15 around gaps 16. According to the design of the invention, the radial height between the bottom of pole gaps 16 and the top of rim 12 is chosen to be large so that the poles are separated from the rotor rim periphery by the pole elements. The magnetic flux thus causes no saturation at the interface between the rim and the pole elements. Dove-tail shaped bases 22, which are disposed in correspondingly shaped recesses 23 in rim 12, are thus disposed outside the region of the flow of the magnetic flux, and the presence of any residual air gaps 24 between the bases of the pole elements and rim 12 is rendered ineffective.

Damper bars 25 are disposed in poles 14 and 15 at one end thereof. The inventive design of the pole elements does not affect the effectiveness of the damper winding, and, in contrast, permits the damper bars to be welded to the respective end plates of pole elements 13. This construction eliminates the need for complicated conventional damper segment pole connections and requires only that an electrically conductive means, such as flexible strap 26, be disposed between partial poles 15 of adjacent pole elements across gap 27 therebetween. Damper winding shorting ring segments need not be used.

Figure 3:
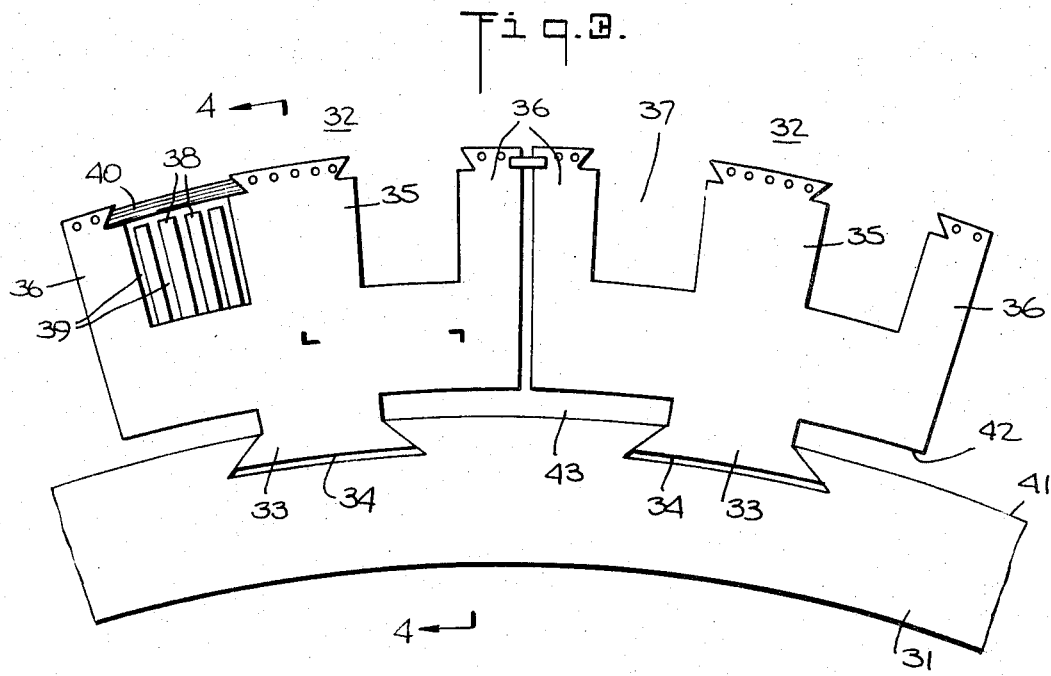
FIG. 3 is a partial, radial sectional view of another embodiment of a pole element for a laminated link rotor constructed according to the invention.
Figure 4:
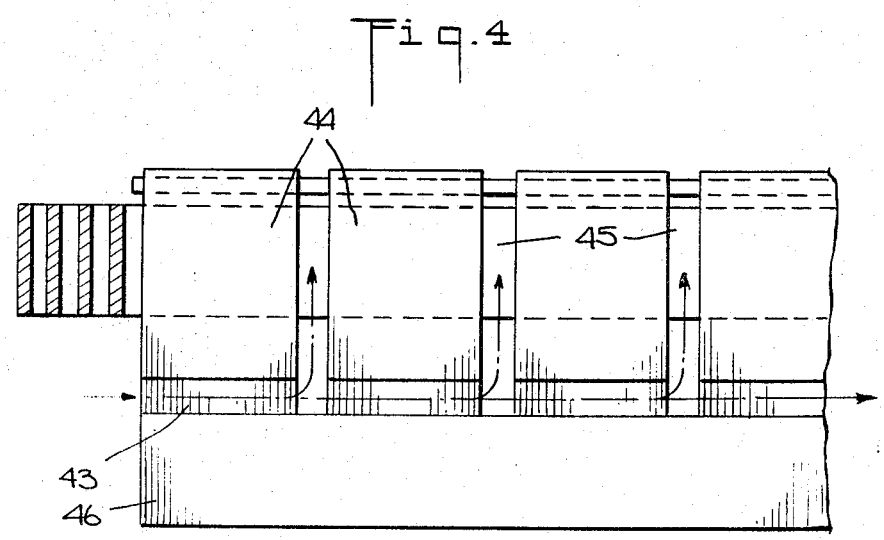
FIG. 4 is a sectional view of the pole element, taken along section 4—4 of FIG. 3.

FIGS. 3 and 4 illustrate another embodiment of a laminated link rotor pole element constructed according to the invention. Machine rim 31 is also constructed of separate steel laminated segments and is supported by spokes attached to a hub. As in the previously described embodiment, pole elements 32 are attached to rim 31 by bases 33 disposed in recesses 34 in rim 31. Pole elements 32 comprise spaced apart complete poles 35 and partial poles 36 between which excitation winding conductors 38, having cooling ducts 39, are secured in gaps 37 by a wedge shaped locking member 40.

In this embodiment of the invention, the lower edge 42 of pole element 32 is spaced apart a considerable distance from the periphery of rim 41 so as to provide a cooling space 43 between the pole element and the rotor. Since the magnetic flux in the machine only flows within the pole element, spaces 43 have no effect on the field. The pole element 32 is also divided axially so as to form a plurality of stacks 44 and radially extending cooling slots 45 disposed therebetween. As indicated by the arrows in FIG. 4, cool air or another gaseous cooling medium flows into the interior of the rotor from end faces 46 of the electric machine through cooling spaces 43 and into radial cooling slots 45. In this respect, the cooling system is similar to that used in asynchronous machines. Thus, independent cooling of the excitation windings and the pole elements of the machine is achieved.

The construction of the rotor as described above has substantially no effect on the advantages obtained by using conventional laminated link rotor pole construction. Maintenance of the inventive pole elements is also simple, and the invention provides the further advantages that the excitation windings may be easily assembled in or removed from the pole element gaps since no pole pieces are required, and that the excitation winding fabrication expense is reduced since only one winding is used for alternate poles of the pole elements.

While there has been disclosed herein what are considered to be the preferred embodiments of the invention, it will be understood by those persons skilled in the art that many changes and modifications may be made thereunto, and it is therefore intended in the appended claims to include all such changes and modifications as fall within the true spirit and scope of the invention.

What is claimed is:

1. In an electric synchronous machine equipped with a laminated rotor and a pole arrangement mountable on the rotor, the pole arrangement comprising: a plurality of pole elements disposed one next to the other about the circumference of the rotor; and mounting means for mounting said pole elements on the rotor including for each of said pole elements an opening formed in the rotor, and a foot-like projection extending from the base of the pole element for engaging said rotor in said opening thereof; each of said pole elements including a pair of half poles disposed at the ends of the element, a complete pole disposed centered between said half poles, and an excitation winding for generating flux that passes into and out of the rotor, said complete pole being so configured and spaced apart from said half poles to conjointly define therewith respective pole gaps having a substantially rectangular shape for receiving said excitation winding therein in surrounding relation to said complete pole and for permitting the insertion and removal of said excitation winding in radial direction, said complete pole and said half poles conjointly defining a magnetic circuit for substantially confining all of said flux of said winding to the pole element in its passage through the rotor.

2. The pole arrangement of claim 1 wherein the laminated rotor has respective end-faces, each two mutually adjacent ones of said pole elements conjointly defining a gap therebetween, and means for electrically interconnecting the half poles of adjacent pole elements at the end-faces of the rotor.

3. The pole arrangement of claim 2, said interconnecting means comprising a flexible, electrically conductive strap member.

4. The pole arrangement of claim 2, each of said pole elements having respective end-plates, said pole arrangement comprising damper bars arranged in each of said pole elements and welded at respective ends thereof to said end-plates.

5. The pole arrangement of claim 1, said excitation winding consisting of a plurality of coils arranged so as to define a plurality of cooling channels for conducting a coolant to cool said winding, said pole gaps being completely filled with said coils except for said channels.

6. The pole arrangement of claim 5, each of said gaps having mutually parallel side walls connected by a bottom wall, the conductor of said coils being flat conductors having flat sides, the conductors being spaced one from the other so as to define one of said channels between each two mutually adjacent ones of the conductors.

* * * * *